United States Patent [19]

Henry et al.

[11] Patent Number: 5,787,495

[45] Date of Patent: Jul. 28, 1998

[54] METHOD AND APPARATUS FOR SELECTOR STORING AND RESTORATION

[75] Inventors: Glenn Henry; Terry Parks, both of Austin, Tex.

[73] Assignee: Integrated Device Technology, Inc., Santa Clara, Calif.

[21] Appl. No.: 572,898

[22] Filed: Dec. 18, 1995

[51] Int. Cl.[6] ............................................. G06F 12/10
[52] U.S. Cl. .................... 711/208; 711/206; 711/209; 711/163; 711/170
[58] Field of Search ................... 711/208, 206, 711/209, 163, 170; 395/568, 651, 682

[56] References Cited

U.S. PATENT DOCUMENTS

| 4,442,484 | 4/1984 | Childs, Jr. et al. | 711/163 |
| 5,125,087 | 6/1992 | Randell | 395/568 |
| 5,339,426 | 8/1994 | Aoshima | 395/651 |
| 5,418,956 | 5/1995 | Willman | 395/682 |

*Primary Examiner*—Eddie P. Chan
*Assistant Examiner*—Than V. Nguyen
*Attorney, Agent, or Firm*—James W. Huffman

[57] ABSTRACT

An apparatus for storing selectors directly into segment registers within a single processor cycle. New selectors are stored into addressable segment registers prior to being validated. Old selectors which are shifted into temporary register space prior to being overwritten. If a selector fails validation tests, and requires restoration, the old selector is shifted back into the appropriate segment register thereby restoring the state of the selector.

15 Claims, 6 Drawing Sheets

FIG. 1
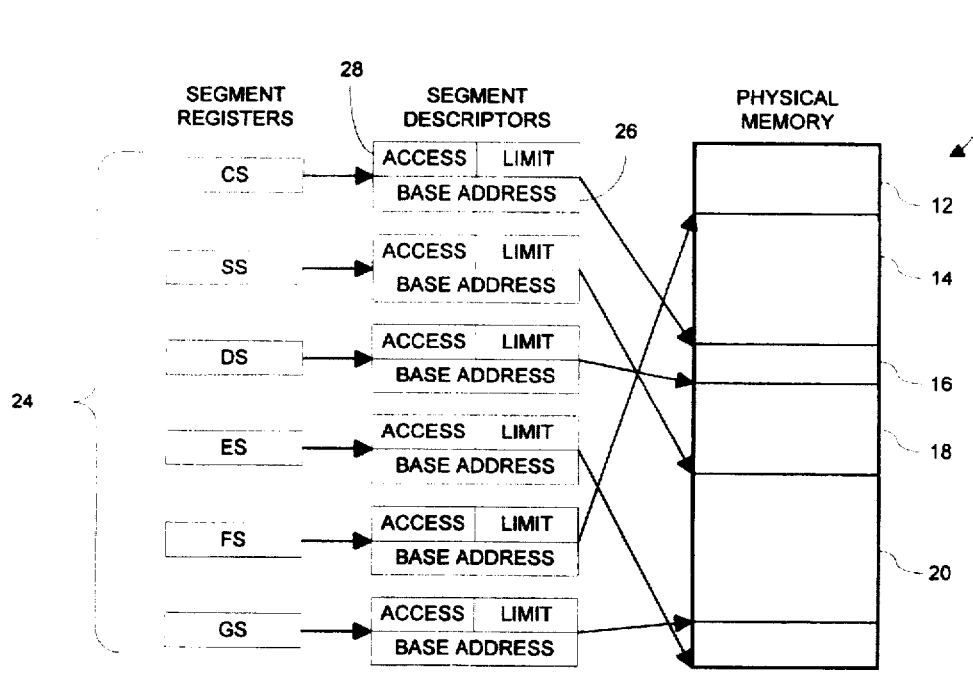
FIG. 2
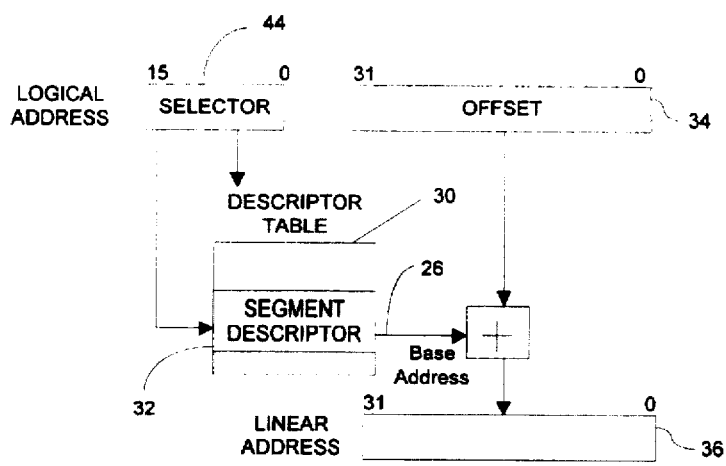
FIG. 3
| VISIBLE PART | INVISIBLE PART | |
|---|---|---|
| SELECTOR | BASE ADDRESS, LIMIT ETC. | CS |
| | | SS |
| | | DS |
| | | ES |
| | | FS |
| | | GS |

# METHOD AND APPARATUS FOR SELECTOR STORING AND RESTORATION

BACKGROUND

1. Field of the Invention

This invention relates in general to the field of segment register loading and more particularly to immediate selector loading and subsequent restoration if needed.

2. Description of the Related Art

Segmentation is a memory management and protection mechanism which allocates main memory by segments and supervises segment related activity. Segmentation is used to give programs independent and protected address spaces. Segments are pointed to in memory by a segment table mechanism similar to that of paging. Segments are located by using a selector, stored in a processor register (or segment register), which indexes into a descriptor table. A descriptor table is made up of a plurality of descriptors which contain information relating to segments. Thus, each descriptor contains information relating to the size of the segment, the base address of the segment, and other type/control information.

The present invention relates to an apparatus and method for improved loading of a selector into a segment register. To better understand the present invention, however, a general background on segment loading is provided. Although segmentation may be used within any processor architecture, for convenience the following discussion will focus on segmentation as implemented in the x86 family. For a general background on protected mode segmentation within the x86 family, see U.S. Pat. No. 4,442,484 entitled "MICROPROCESSOR MEMORY MANAGEMENT AND PROTECTION MECHANISM" incorporated herein by reference.

Referring to FIG. 1 of the drawings, a multi-segment memory model is shown. Physical memory 10 is divided up into a number of segments 12, 14, 16, 18, 20 and 22. Each of these segments can be from 1 byte to 4 Gbytes long. The segments are referenced by segment descriptors 28 which are, in turn, located using selectors stored in segment registers 24.

Within segmentation, a logical address is formed out of two components. The first component is a 16-bit selector, used to determine the linear base address 26 (the address of the first byte of the segment) of the segment. The second component is a 32 bit offset. The selector is stored within one of the segment registers 24. The linear base address is stored within a descriptor register 28. For each segment register 24 there is an associated descriptor register 28.

Referring to FIG. 2, the selector 24 is shown accessing a descriptor table 30. Within the descriptor table 30 are a plurality of segment descriptors 28. The selector 24 points to a particular segment descriptor 32 to determine the linear base address 26 for the segment. An offset 34 is used to determine the internal address within a segment. The offset of a given memory address is its distance in bytes from the segment base address. Thus, the offset 34 is added to the linear base address to calculate the linear address. If paging is not used, the linear address corresponds to the physical address in memory.

FIG. 3 illustrates a segment register file 38 which contains six selector registers 40, and six corresponding descriptor registers 42. Every segment register has a "visible" part and an "invisible" part. The visible part indicates that an instruction can read or store a value in the register. The invisible part is maintained by the processor, and is updated as part of a selector load operation. For example, when a MOV instruction is used to load a selector into a "visible" segment register, the processor automatically fetches the base address, limit, etc., and loads these fields into the "invisible" part of the segment register.

Referring to FIG. 4, a selector 44 is shown. The selector 44 points to information which defines a segment, called a segment descriptor. Although a program may use more than six segments, additional segments may be accessed by moving a selector into a segment register, as discussed below. The segment selector 44 identifies a segment descriptor first by specifying a descriptor table with the table index bit 48. This bit indicates which of two tables, (0=the global descriptor table, 1=the local descriptor table), is referenced by the selector 44. Second, the selector 44 uses an index 46 to identify one of a number of descriptors which may be referenced. Third, an RPL field 50 defines the privilege level for the selector. The privilege level is compared against the privilege level of the segment to determine whether the calling program can access protected data.

Now referring to FIG. 5, a map of a descriptor 52 is shown. The descriptor 52 is a data structure in memory which provides a processor with the size and location of a segment, as well as control and status information. The descriptor 52 contains a 32-bit base 54 that defines the location of the segment, and a 20-bit limit 56 which defines the size of the segment. Additional fields are provided that specify the segment type (e.g., read-only, execute only, etc.), the privilege level, and whether the segment is present in memory.

Having provided a general background of the structure of a segment register file, a prior art method for loading a segment register will now be discussed. The method shown is similar to that described in U.S. Pat. No. 4,442,484, referenced above. Referring to FIGS. 6A and 6B, a segment register load begins at block 60 by loading a selector value X into temporary space. The flow proceeds to decision block 62 which tests to see if the selector X is within the descriptor table. If yes, the logic reads the access rights (at block 64) from the descriptor table. If the test in block 62 is negative, a protection trap (at block 82) occurs. The flow from block 64 proceeds to block 66 which computes the effective privilege level for the segment. At decision block 68 a test is made to see if the segment X is an executable, readable and conforming segment. If yes, the flow proceeds to block 74. If no, a test is made at decision block 70 to see if the effective privilege level is greater than or equal to the current privilege level. If no, a protection trap occurs (at block 82). If yes, the flow continues to decision block 72 wherein a test is made to see if the access rights indicate that the segment X is executable. If yes, this ends the test for data-type segments, and flow proceeds to decision block 74. If no, flow proceeds to decision block 80 wherein a test is made to determine whether segment X is readable. If no, a protection trap occurs (at block 82). If yes, flow proceeds to block 74. At decision block 74 a test is made to determine whether segment X is present in memory. If no, a not present trap occurs (at block 84). If yes, flow proceeds to block 76 wherein the segment register fields are loaded (at blocks 76 and 78). The selector is loaded from the temporary space into the selector register at block 76, and the descriptor is loaded into the descriptor register at block 78. At this point, the segment information has been loaded into a segment register, and flow is done (at block 86).

What is important to understand, at this point, is that to load a segment register, a selector must first be placed into temporary space, tests must be performed to determine whether the selector/descriptor are valid, and only if valid, can they then be moved into the segment register. Although such a requirement insures that an invalid selector/descriptor will not be loaded into a segment register, such insurance comes at a price. And the prices is performance. Having to first load a selector into temporary space, and later, after testing, move the selector from temporary space into permanent space, requires that the processor "look"0 at the selector twice to move it into the segment register. This takes precious processor time.

SUMMARY

For the foregoing reasons, there is a need for a method and apparatus to improve selector loading by moving a selector directly into a segment register, and then providing a mechanism for restoring an overwritten register, should the newly loaded selector be found invalid.

To address the above detailed deficiencies, it is an object of the present invention to provide an apparatus for storing a selector into a segment register, within a single clock cycle, and subsequently allow the segment register to be restored, if needed.

Accordingly, in the attainment of the aforementioned object, it is a feature of the present invention to provide a register file for directly loading a selector where the register file allows restoration of the selector, as needed. The register file includes a plurality of descriptor registers, and a plurality of selector registers, associated with the descriptor registers. The selector registers include a first word, for storing a new selector, and a second word, adjacent to the first word, for storing an old selector. When a subsequent new selector is loaded the new selector becomes the old selector.

An additional feature of the present invention is provided by a register file, as mentioned above, where the new selector may be stored in the first word during the same clock cycle that the old selector is stored in the second word.

A further feature of the present invention is provided by a register file where the old selector may be shifted from the second word to the first word to restore the old selector.

An additional feature of the present invention is provided by a register file where the first word and the second word are concatenated such that the first word forms the lower 16 bits of a long word, and the second word forms the upper 16 bits of the long word.

An advantage of the present invention is that by providing a temporary register for the old selector, the new selector can be moved directly into the segment register prior to testing. Should the new selector be found valid, the time required to load a selector has been improved.

Another feature of the present invention is provided by an apparatus for loading a selector into a segment register. The apparatus includes a plurality of segment registers for storing selectors and descriptors, a plurality of temporary registers, associated with the plurality of segment registers, for temporarily storing old selectors that may be overwritten, and a shifter, connected to the segment registers, for shifting the old selectors back to the segment registers, as needed.

A further feature of the present invention is provided by a method for moving a selector into a segment register, which allows restoring the segment register, as needed. The method includes moving a new selector into the segment register, and while moving the new selector into the segment register, storing an old selector into a second register.

A further feature of the present invention is provided by the above method where, upon request, the old selector is shifted back into the segment register.

An additional feature of the present invention is provided by the above method where moving the new selector and storing the old selector occur at the same time.

The foregoing has outlined rather broadly the objects, features and technical advantages of the present invention so that the detailed description of the invention that follows may be better understood. Those skilled in the art should appreciate that they can readily use the disclosed embodiments as a basis for designing or modifying other structures for carrying out the same purposes of the present invention.

DESCRIPTION OF THE DRAWINGS

These and other objects, features, and advantages of the present invention will become better understood with regard to the following description, appended claims, and accompanying drawings where:

FIG. 1 is a multi-segment model illustrating a prior art segmentation mechanism.

FIG. 2 is a mechanism for calculating a linear address from the segmentation mechanism of FIG. 1.

FIG. 3 is an illustration showing the "visible" and "invisible" part of the segment registers of FIG. 1.

DETAILED DESCRIPTION

Figure 4:
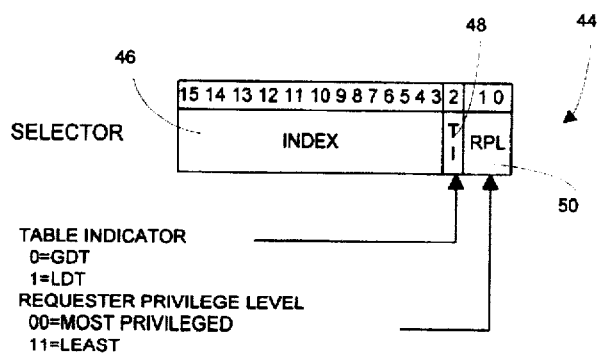
FIG. 4 illustrates the format of a segment selector.
Figure 5:
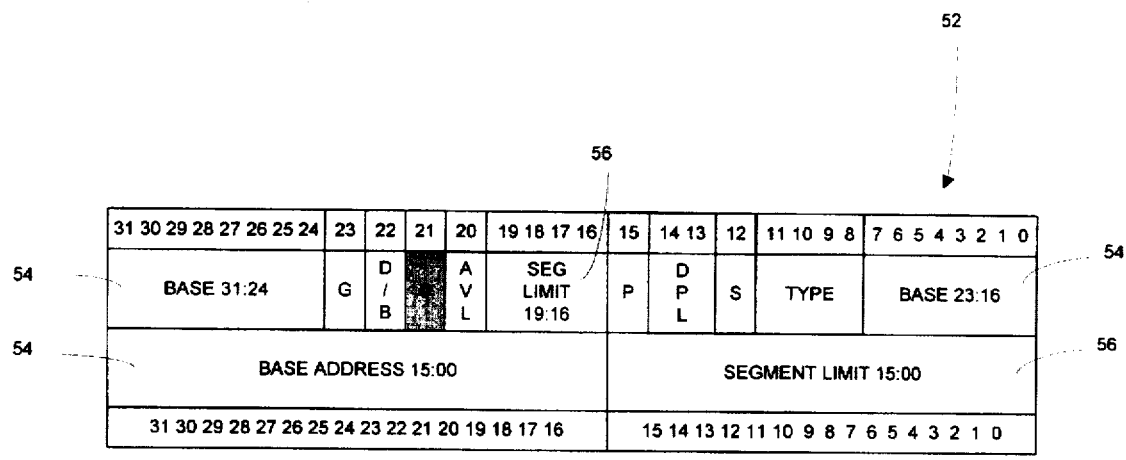
FIG. 5 illustrates the format of a segment descriptor.
Figure 5:
Figure 6A:
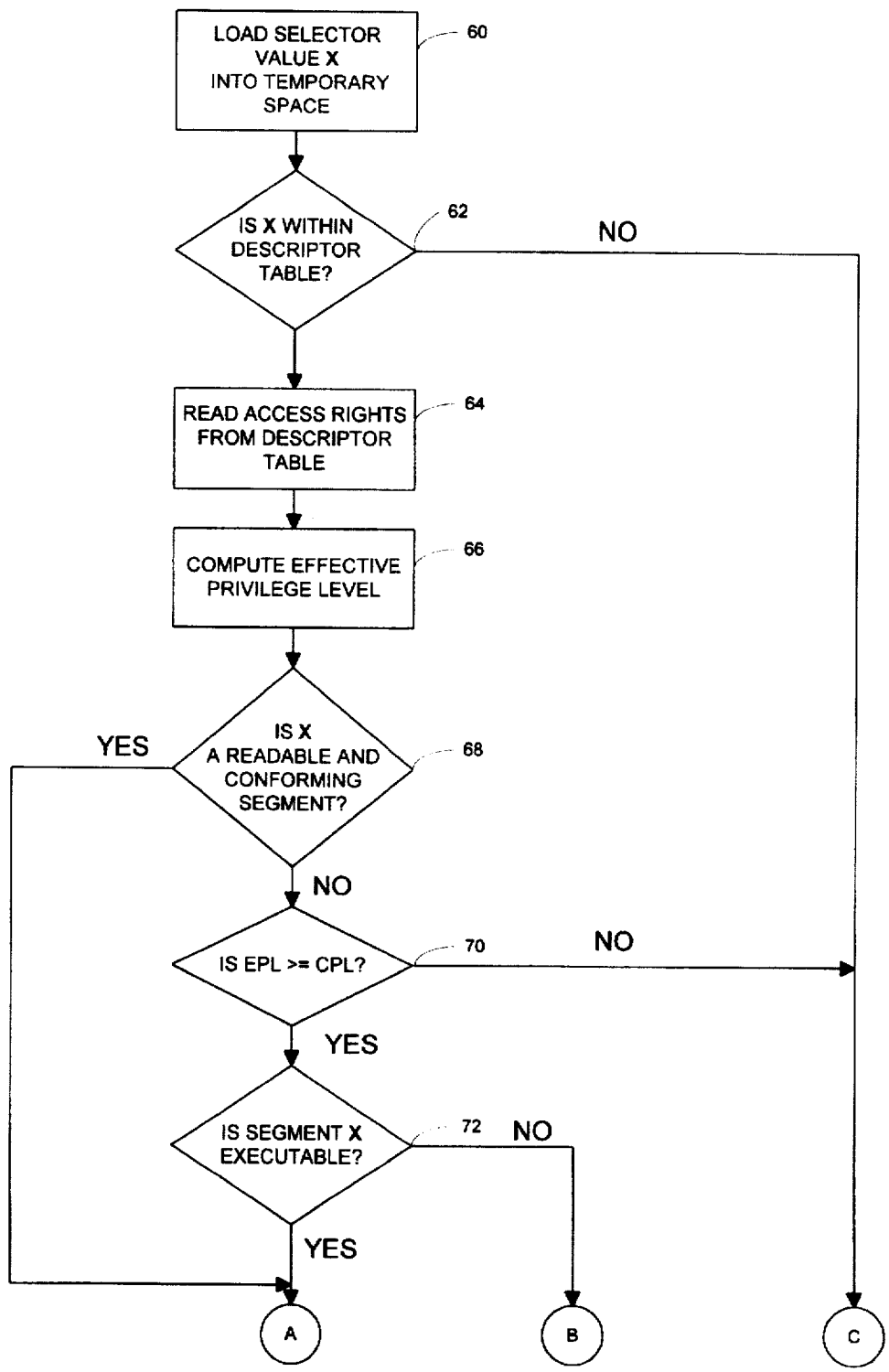
FIGS. 6A and 6B show a flow chart illustrating the steps required for loading a segment selector.
Figure 6B:
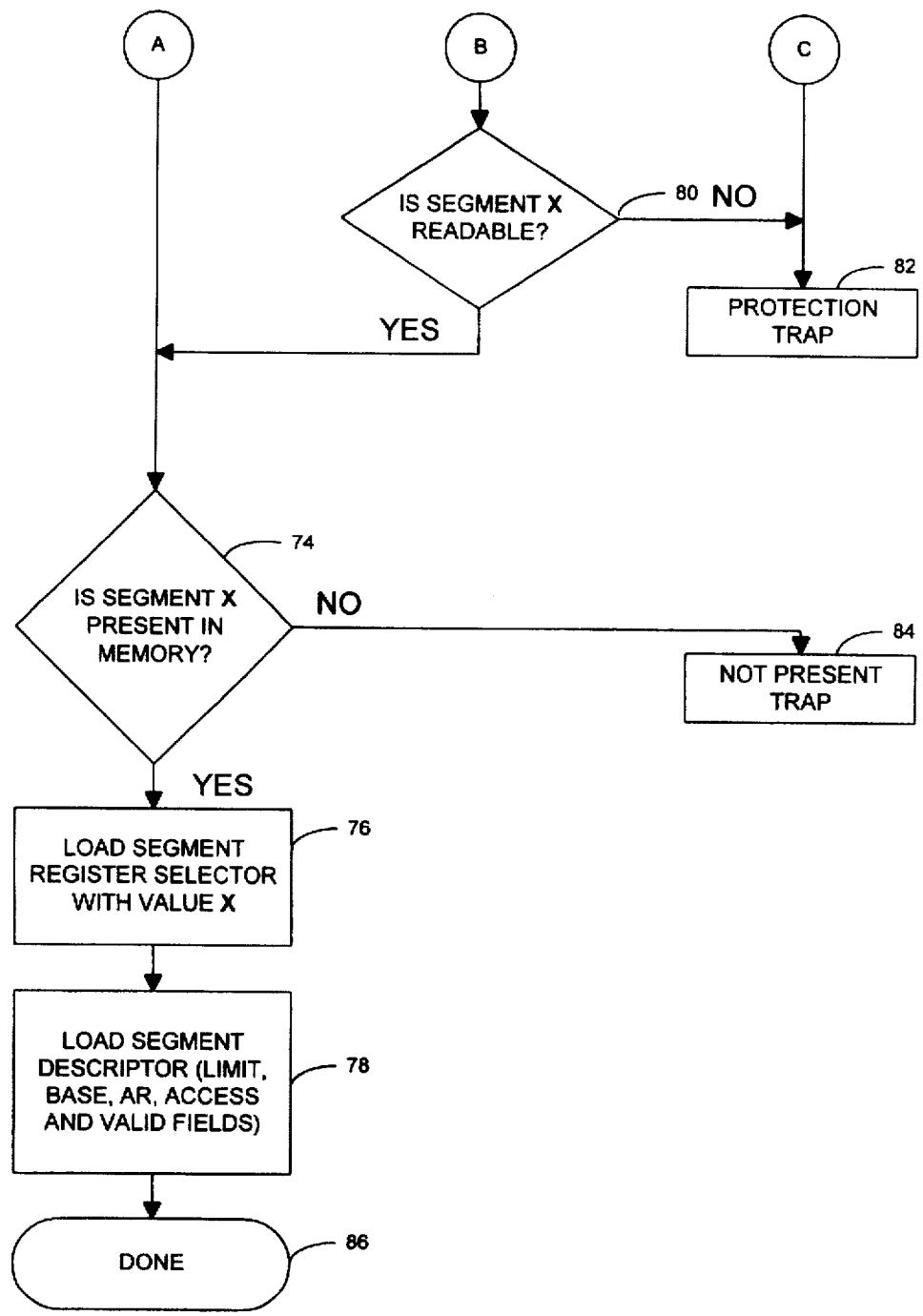
Figure 7:
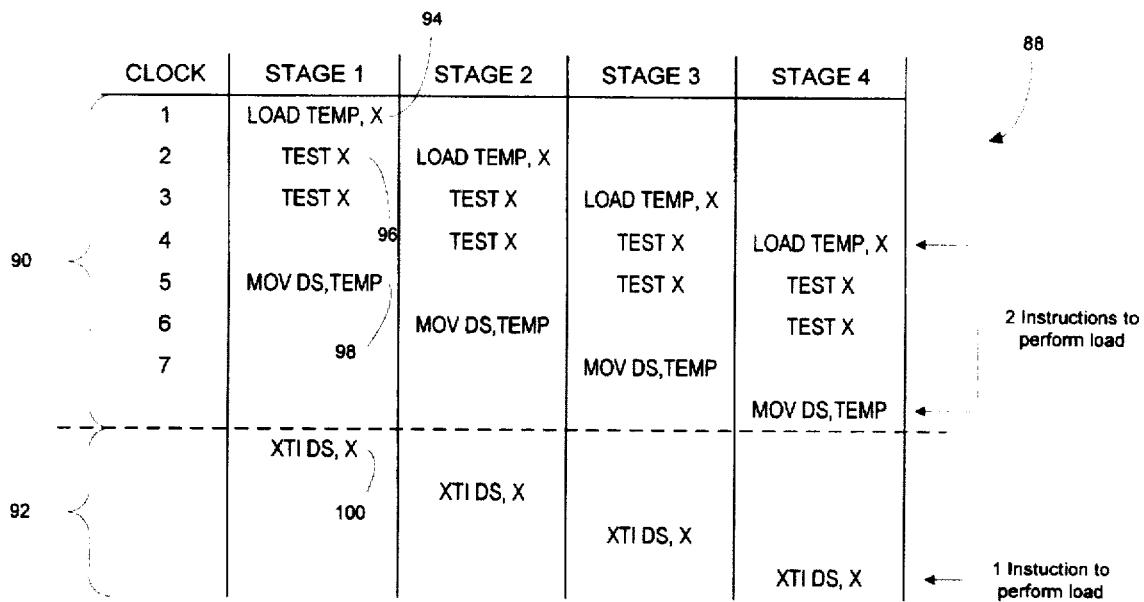
FIG. 7 is a pipeline sequence illustrating the steps of FIGS. 6A & 6B, and an instruction according to the present invention.

Referring to FIG. 7, a pipeline view 88 of a selector load is shown. The pipeline view of the selector load illustrates the prior art method of loading a selector 90 as illustrated in FIGS. 6A and 6B, and the present inventions method of loading a selector 92. First, the method 90.

Selector loading begins at Stage 1, clock cycle 1 with the instruction 94 (LOAD TEMP, X) which loads a selector value X into a temporary register (not shown). It should be appreciated by one skilled in the art, that Stages 1, 2, 3 and 4 conform to standard Fetch, Decode, Execute, and Write Back stages of a pipeline processor. This instruction then proceeds down the pipeline. The next set of instructions 96 (TEST X) perform the selector/descriptor tests that were discussed in the Background with reference to FIGS. 6A and 6B. If all of the tests are passed, a final instruction 98 (MOV DS,TEMP) moves the selector from the temporary register into the segment register DS.

What should be clear from the above, is that regardless of how many clock cycles are required to test the selector/descriptor, at least two clock cycles are required to first move the selector into a temporary register, and later move the selector from the temporary register into the segment register DS.

The present invention presumes that the selector that is being read is valid, and moves it directly into the segment register DS. To move a selector directly into a segment register requires only one clock. Thus, if the selector is valid, the present invention has improved the performance of a selector load by 100%. This is illustrated by instruction 100 (XTI DS,X). This instruction moves selector value X directly into the segment register DS. What should be clearly understood, however, is that moving a selector directly into a segment register also writes over the prior value in the selector. If for some reason the new selector is not valid, or should not have been loaded, then there must be a mechanism for restoring the old selector. In the prior art method discussed above, no restoration mechanism was provided, because the old selector was not overwritten until after the new selector was validated. But, in the present invention, by moving the new selector directly into the segment register, restoration is mandatory.

Figure 8:
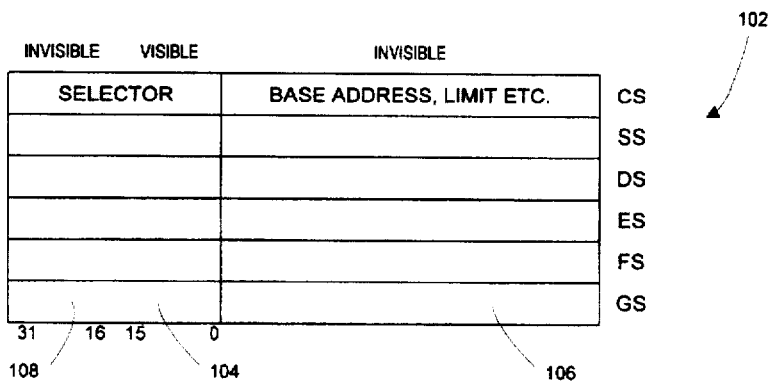
FIG. 8 is an illustration showing the "visible" and "invisible" part of the segment registers of the present invention.

Referring to FIG. 8, a register file 102 is shown which illustrates a register architecture that allows for the immediate selector loading of the present invention, but also provides temporary storage for the old selector. More specifically, visible 16-bit selector registers 104 are provided, along with associated invisible descriptor registers 106, as in FIG. 3. In addition, invisible 16-bit temporary selector registers 108 are provided. These registers 108 are used by the processor (not shown) as a means to temporarily store old selectors that are overwritten, and later to restore the selector registers, as needed.

Figure 9:
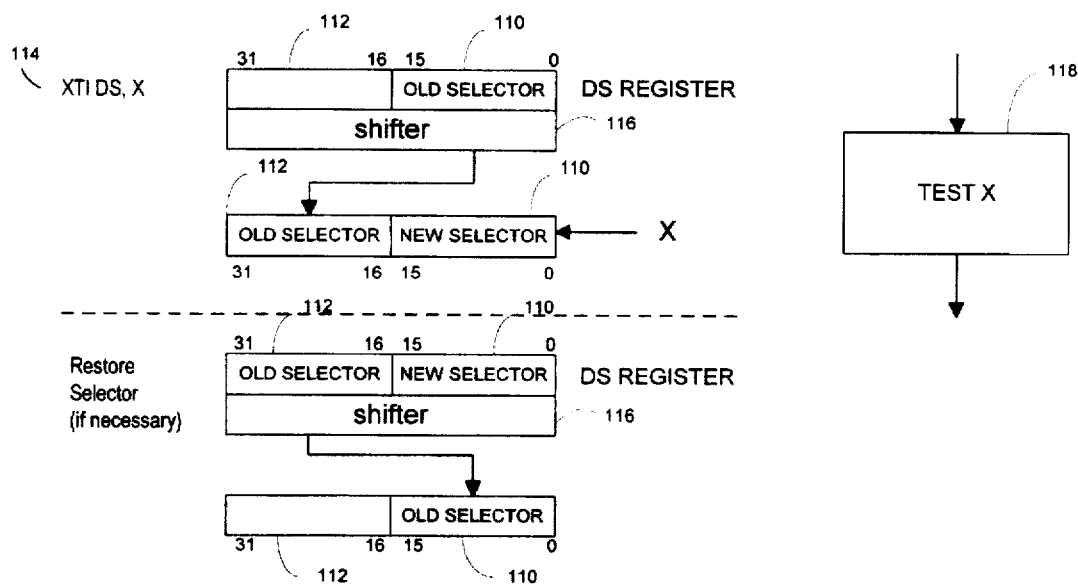
FIG. 9 illustrates the selector store and the selector restoration mechanism according to the present invention.

Referring to FIG. 9, a DS selector register 110 is provided, along with an associated temporary register 112. When the processor executes an instruction 114 (XTI DS,X), a value of X is stored directly into the DS register 110. In addition, a shifter 116 is provided which shifts the old selector into the temporary register 112 at the same time the value of X is moved into the DS register 110. Thus, within a single clock cycle, a selector value X has been stored directly within the selector register 110, and the old selector is shifted into a temporary register 112.

During the execution of instruction 114, the processor is also performing a series of tests 118. These tests are similar to those discussed with reference to FIGS. 6A and 6B. If the tests indicate that the selector X is valid, then time has been saved by already storing it into the selector register 110. If, the tests indicate that the selector should not have been stored, then the processor needs to restore the state of the selector register 110. To restore register 110, the shifter simply shifts the old selector from the temporary register 112 back into the selector register 110.

Thus, for those instances where the selector is valid, the present invention provides a mechanism for storing the selector directly into the selector register, thereby improving the performance of a selector load by 100%. And, for those instances where the selector is invalid, or should not have been stored, the present invention provides a mechanism for restoring the selector register 110 to its original state.

Although the present invention and its advantages have been described in detail, it should be understood that various changes, substitutions and alterations can be made herein without departing from the spirit and scope of the invention as defined by the appended claims. For example, what has been described is a mechanism for temporarily storing an "old" selector into a temporary register that is the high order word associated with a low order selector register. Then, if required, the high order word is simply shifted into the low order selector register if restoration is required. One skilled in the art should appreciate that the "old" selector could also be stored in some other latch that is not physically a part of the segment register file, but is simply connected to it. Other structures may also be provided that store an old selector into a temporary space at the same time a new selector is moved into a selector register. Then, if selector restoration is required, the old selector can be moved from the temporary space back into the selector register.

We claim:

1. A register file for directly loading a selector, the register file allowing restoration of the selector, as needed, the register file comprising:

a plurality of descriptor registers;

a plurality of selector registers, associated with said descriptor registers, said selector registers comprising:
a first word, for storing a new selector; and
a second word, adjacent to said first word, for storing an old selector;

wherein said new selector becomes said old selector when a subsequent new selector is loaded; and wherein said new selector may be stored in said first word during the same clock cycle that said old selector is stored in said second word.

2. The register file for directly loading a selector, the register file allowing restoration of the selector, as needed, the register file comprising:

a plurality of descriptor register;

a plurality of selector registers, associated with said descriptor registers, said selector registers comprising:
a first word, for storing a new selector; and
a second word, adjacent to said first word, for storing an old selector;

wherein said new selector becomes said old selector when a subsequent new selector is loaded; and wherein said old selector may be shifted from said second word to said first word to restore said old selector.

3. A register file for directly loading a selector, the register file allowing restoration of the selector, as needed, the register file comprising:

a plurality of descriptor registers;

plurality of selector registers, associated with said descriptor registers, said selector registers comprising:
a first word, for storing a new selector; and
a second word, adjacent to said first word, for storing an old selector;

wherein said new selector becomes said old selector when a subsequent new selector is loaded; and wherein said second word is a 16 bit register into which said new selector from said first word may be shifted.

4. The register file as recited in claim 3 wherein said new selector becomes said old selector when it is shifted into said second word.

5. The register file as recited in claim 3 wherein another selector is stored in said first word, becoming a second new selector, when said new selector is shifted into said second word.

6. A register file for directly loading a selector, the register file allowing restoration of the selector, as needed, the register file comprising:

a plurality of descriptor registers;

a plurality of selector registers, associated with said descriptor registers, said selector registers comprising:
a first word, for storing a new selector; and
a second word, adjacent to said first word, for storing an old selector;

wherein said new selector becomes said old selector when a subsequent new selector is loaded; and wherein said first word and said second word are concatenated such that said first word forms the lower 16 bits of a long word, and said second word forms the upper 16 bits of said long word.

7. An apparatus for loading a selector into a segment register, the apparatus comprising:

a plurality of segment registers for storing selectors and descriptors;

a plurality of temporary registers, associated with said plurality of segment registers, for temporarily storing old selectors that may be overwritten; and a shifter, connected to said segment registers, for shifting said old selectors back to said segment registers, as needed.

8. The apparatus for loading a selector, as recited in claim 7, wherein each of said segment registers comprise:

a selector register; and a descriptor register associated with said selector register.

9. The apparatus for loading a selector, as recited in claim 8, wherein each of said selector registers are associated with at least one of said plurality of temporary registers.

10. The apparatus for loading a selector, as recited in claim 8, wherein said selector is an addressable 16 bit register.

11. The apparatus for loading a selector, as recited in claim 7, wherein said selectors become said old selectors when they are stored into said plurality of temporary registers.

12. A method for moving a selector into a segment registers, which allows restoring the segment register, as needed, the method comprising:

moving a new selector into said segment register;

while moving said new selector into said segment register, storing an old selector into a second register; and upon request, shifting said old selector back into said segment register.

13. The method for moving a selector as recited in claim 12 wherein said shifting said old selector restores said segment register to the state it was in prior to said moving said new selector.

14. A method for moving a selector into a segment register, which allows restoring the segment register, as needed, the method comprising:

moving a new selector into said segment register;

while moving said new selector into said segment register, storing an old selector into a second register; and wherein said moving a new selector and said storing an old selector occur at the same time.

15. A method for moving a selector into a segment register, which allows restoring the segment register, as needed, the method comprising:

moving a new selector into said segment register;

while moving said new selector into said segment register, storing an old selector into a second register;

during said moving said new selector and said storing said old selector, testing a descriptor associated with said new selector to determine whether said new selector should be moved into said segment register; and after said testing a descriptor, shifting said old selector back into said segment register if said new selector should not have been moved into said segment register.

* * * * *